US008662575B2

(12) United States Patent
Tamura

(10) Patent No.: US 8,662,575 B2
(45) Date of Patent: Mar. 4, 2014

(54) VEHICLE CHASSIS SIDE STRUCTURE

(75) Inventor: Naoyuki Tamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/516,368

(22) PCT Filed: Oct. 8, 2010

(86) PCT No.: PCT/JP2010/067745
§ 371 (c)(1),
(2), (4) Date: Jun. 15, 2012

(87) PCT Pub. No.: WO2011/077808
PCT Pub. Date: Jun. 30, 2011

(65) Prior Publication Data
US 2012/0248825 A1 Oct. 4, 2012

(30) Foreign Application Priority Data

Dec. 22, 2009 (JP) ................................. 2009-290712

(51) Int. Cl.
*B60J 7/00* (2006.01)
(52) U.S. Cl.
USPC ........................................................ 296/209
(58) Field of Classification Search
USPC ......... 296/209, 146.6, 146.9, 187.12, 203.03, 296/204, 29, 203.01; 105/248, 406.1, 418; 405/291, 299
See application file for complete search history.

(56) References Cited

U.S. PATENT DOCUMENTS

| | | | | |
|---|---|---|---|---|
| 4,252,364 A * | 2/1981 | Toyama et al. | .......... | 296/203.01 |
| 4,582,357 A * | 4/1986 | Nakamura et al. | ....... | 296/203.03 |
| 4,826,238 A * | 5/1989 | Misono et al. | ................ | 296/209 |
| 4,911,495 A * | 3/1990 | Haga et al. | .................... | 296/209 |
| 5,246,264 A * | 9/1993 | Yoshii | ....................... | 296/203.03 |
| 5,354,115 A * | 10/1994 | Esaki | ....................... | 296/203.03 |
| 5,370,438 A * | 12/1994 | Mori et al. | ................ | 296/203.02 |
| 5,382,071 A * | 1/1995 | Enning et al. | ............ | 296/203.03 |
| 5,443,297 A * | 8/1995 | Tanaka et al. | ............ | 296/203.03 |
| 5,641,194 A * | 6/1997 | Honma et al. | ............ | 296/203.03 |
| 5,782,525 A * | 7/1998 | Honma et al. | ........... | 296/187.12 |
| 5,860,694 A * | 1/1999 | Seefried et al. | .......... | 296/203.03 |
| 6,354,656 B1 * | 3/2002 | Hwang | ........................ | 296/209 |

(Continued)

FOREIGN PATENT DOCUMENTS

| JP | 59-13370 | 1/1984 |
|---|---|---|
| JP | 08-183473 | 7/1996 |

(Continued)

*Primary Examiner* — Kiran B Patel
(74) *Attorney, Agent, or Firm* — Rankin, Hill & Clark LLP

(57) ABSTRACT

Disclosed is a vehicle chassis side structure comprising a side sill (15) whereupon a closed section is formed from a side sill outer (37) and a side sill inner (38). The side sill outer (37) comprises an upper wall portion (44) and a lower wall portion (45). The closed section is formed in a polygonal shape by forming an upper bead (47) from the leading end of the side sill (15) to the trailing end thereof, upon at least the upper wall portion (44) from among the upper and lower wall portions (44, 45). The vehicle chassis side structure further comprises a reinforcement member (64) upon a central joining portion (56) whereat a center pillar (17) is joined, which closes an opening (61) of the upper bead (47) and an opening (62) of a lower bead (48), forming the closed section.

14 Claims, 14 Drawing Sheets

(56) References Cited

U.S. PATENT DOCUMENTS

| | | | |
|---|---|---|---|
| 6,554,350 B2* | 4/2003 | Takahara | 296/187.05 |
| 6,854,795 B2* | 2/2005 | Yamazaki et al. | 296/209 |
| 7,264,302 B2* | 9/2007 | Nagashima | 296/187.12 |
| 7,520,557 B2* | 4/2009 | Yoshida et al. | 296/155 |
| 8,118,355 B2* | 2/2012 | Tamura et al. | 296/209 |
| 8,282,154 B2* | 10/2012 | Maruyama | 296/193.05 |
| 8,297,690 B2* | 10/2012 | Walter et al. | 296/204 |
| 2007/0187995 A1* | 8/2007 | Mouch et al. | 296/209 |
| 2010/0109385 A1* | 5/2010 | Yamada et al. | 296/209 |
| 2012/0274099 A1* | 11/2012 | Tamura | 296/193.06 |
| 2012/0306239 A1* | 12/2012 | Tamura et al. | 296/209 |
| 2013/0026786 A1* | 1/2013 | Saeki | 296/187.12 |
| 2013/0049391 A1* | 2/2013 | Kurogi et al. | 296/30 |
| 2013/0049405 A1* | 2/2013 | Kurogi et al. | 296/203.01 |
| 2013/0140854 A1* | 6/2013 | Mori | 296/209 |

FOREIGN PATENT DOCUMENTS

| | | |
|---|---|---|
| JP | 09-066859 | 3/1997 |
| JP | 2000-095151 | 4/2000 |
| JP | 2001-071949 | 3/2001 |
| JP | 2006-044525 | 2/2006 |
| JP | 2008-296600 | 12/2008 |
| JP | 2010-137839 | 6/2010 |

* cited by examiner

VEHICLE CHASSIS SIDE STRUCTURE

TECHNICAL FIELD

The present invention relates to a vehicle body side part structure including a side sill forming a bottom frame of a vehicle doorway, and a front pillar and a center pillar forming a vertical frame of the vehicle doorway, the side sill being joined to the front and center pillars.

BACKGROUND ART

Patent Literature 1 filed by the present assignee discloses a vehicle body side part structure in which a center pillar is jointed to a side sill, and an inner member of the center pillar, which faces a passenger compartment, is extended downward such that an opening of an upper groove-shaped bead formed on the side sill is closed by the downward extension of the inner member.

In the vehicle body side part structure of Patent Literature 1, however, the center pillar's inner member needs to provide an extension for exclusive purpose of closing the opening of the upper bead of the side sill, thus adding further complexity to the center pillar structure.

Consequently, when used with a center pillar of normal design, the side sill is required to provide an increased mechanical strength in a middle section thereof where the center pillar is to be joined.

A similar problem has been experienced at a front section of the side sill to which the front pillar is jointed.

PRIOR ART LITERATURE

Patent Literature

Patent Literature 1: Japanese Patent Application No. 2009-176856

SUMMARY OF INVENTION

Technical Problem

An object of the present invention is to provide a vehicle body side part structure including a side sill having an increased strength both at central and front parts thereof where a center pillar and a front pillar are joined to the side sill.

Solution to Problem

According to one aspect of the present invention, there is provided a vehicle body side part structure comprising: a side sill disposed on right and left sides of a floor of a vehicle body and extending in a longitudinal direction of the vehicle body; a front pillar extending from a front part of the side sill to a roof; and a center pillar extending from a central part of the side sill to the roof, wherein the side sill is formed of an outer side sill member and an inner side sill member, the outer and inner side sill members jointly defining a closed cross section extending in the longitudinal direction of the vehicle body; wherein the outer side sill member includes an upper wall extending to slant upwardly from a vehicle exterior side toward a vehicle interior side and a lower wall extending to slant downwardly from the vehicle exterior side toward the vehicle interior side, at least one of the upper and lower walls having a bead extending from a front end of the side sill to a rear end thereof such that the closed cross section is formed in a polygonal shape, wherein the bead is a recessed portion indented inwardly of the closed cross section and including lateral walls and a bottom wall formed integrally with the lateral walls, and the bottom wall has a width greater than a height of the lateral walls, wherein the central part of the side sill has a central joining portion where the center pillar is joined to the side sill, the front part of the side sill has a front joining portion where the front pillar is joined to the side sill, and at least one of the central and front joining portions is provided with a reinforcement member, the reinforcement member being positioned to close an opening of the bead to define a second closed cross section jointly with the bead.

Preferably, the outer side sill member includes a vertical wall connected between the upper wall and the lower wall and located on the vehicle exterior side, and a lateral bead formed on the vertical wall such that the closed cross section defined between the outer and inner side sill members is formed in a polygonal shape, and the reinforcement member is configured to close the opening of the bead and an opening of the lateral bead to form respective closed cross sections jointly with the beads.

Preferably, the reinforcement member has an elongated portion extending rearwardly of the vehicle body from the front joining portion of the side sill by a desired length.

Preferably, the reinforcement member has an elongated portion extending longitudinally in at least one of a forward direction and a rearward direction of the vehicle body from the central joining portion of the side sill by a desired length.

Preferably, the side sill includes a bulkhead disposed therein to partition an internal space of the side sill, the bulkhead being arranged to overlap the reinforcing member via the outer side sill member.

Preferably, the side sill includes a bulkhead disposed therein to partition an internal space of the side sill, and the reinforcement member is arranged to extend to such an extent that the reinforcement member overlaps the bulkhead in a widthwise direction of the vehicle.

Preferably, the bulkhead defines a closed cross section jointly with the outer side sill member.

Preferably, the bulkhead has an engagement recess fitted with a lateral bead formed on a vertical wall of the outer side sill member, a bottom of the engagement recess being in contact with a bottom wall of the lateral bead, and that part of the bulkhead which excludes the engagement recess is in contact with the vertical wall of the outer side sill member.

Advantageous Effects of Invention

When the reinforcement member is mounted on the central joining portion and thus interposed between the center pillar and the side sill, the bead communicating with the internal space of the center pillar of closed cross section is made to have a closed cross section by the reinforcement member. Thus the strength of the side sill is enhanced.

Similarly, when the reinforcement member is mounted on the front joining portion, the bead communicating with the internal space of the front pillar of closed cross section is made to have a closed cross section by the reinforcement member. Thus the strength of the side sill is enhanced.

The reinforcement member is configured to close the opening of the bead and the opening of the lateral bead to thereby define the respective closed cross sections jointly with the beads, thus enhancing the strength of the side sill.

The reinforcement member has an elongated portion extending from the front joining portion in a rearward direction of the vehicle by a desired length. Such arrangement enhances the strength of the side sill and enlarges, in the longitudinal direction of the vehicle, such an area of the side sill that endures a lateral collision load.

The reinforcement member may also have an elongated portion extending from the central joining portion in at least in one of a forward direction and a rearward direction of the vehicle by a desired length. Such arrangement enhances the strength of the side sill and enlarges, in the longitudinal direction of the vehicle, such an area of the side sill that endures a lateral collision load.

The bulkhead is arranged to overlap the reinforcement member with the outer side sill member interposed therebetween. Therefore a load applied to the reinforcement member is directly transmitted to the bulkhead, thus enhancing the strength of the side sill.

The reinforcement member extends to such an extent that the reinforcement member overlaps the bulkhead in a widthwise direction of the vehicle. Therefore, a load applied to the reinforcement member is directly transmitted to the bulkhead, thus enhancing the strength of the side sill.

The bulkhead is configured to define a closed cross section jointly with wall portions of the outer side sill member and respective lateral walls of the bead, thereby providing an increased number of closed cross sections of the side sill. As a result, the strength of the side sill is further enhanced.

In an assembled state, the engagement recess of the bulkhead is fitted with the lateral bead while the bottom of the engagement recess is in contact with the bottom wall of the lateral bead and that part of the bulkhead which excludes the engagement recess is in contact with the vertical wall of the outer side sill member. This arrangement limits an undesired inclination of the bulkhead, thereby advantageously facilitating the installation of the bulkhead onto outer side sill member.

DESCRIPTION OF EMBODIMENTS

Certain preferred embodiments of the present invention will be described below with reference to the attached drawings.

First Embodiment

Figure 1:
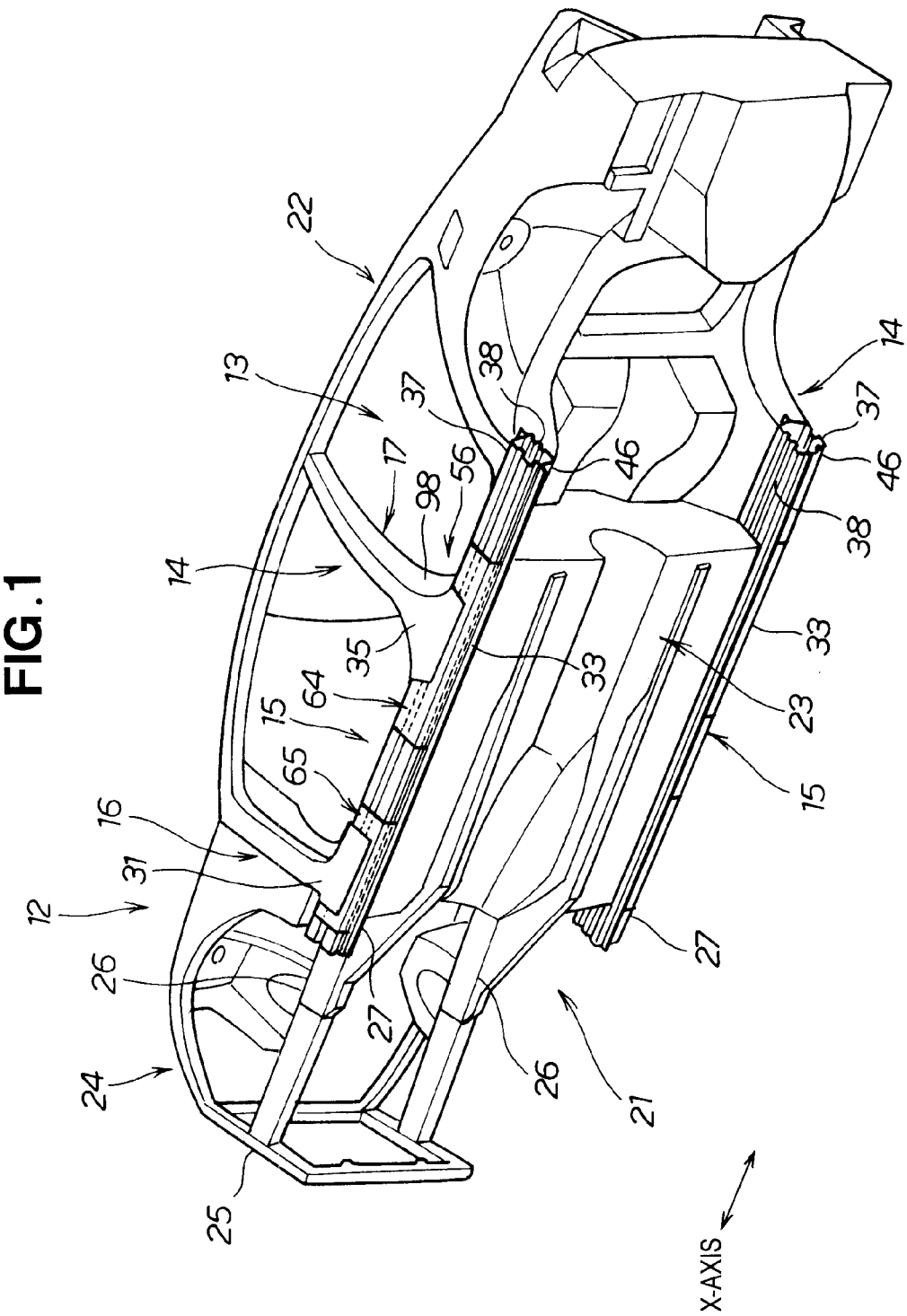
FIG. 1 is a perspective view illustrating a vehicle body provided with a vehicle body side part structure according to a first embodiment of the present invention.

A vehicle body front part structure according to a first embodiment of the present invention is implemented in a vehicle 12, as shown in FIG. 1. The vehicle body side part structure is incorporated in a side body 14 consisting of a side wall of a passenger compartment 13 of the vehicle 12, and includes a side sill 15 forming a lower part of the side body 14, a front pillar 16 and a center pillar 17.

Figure 2:
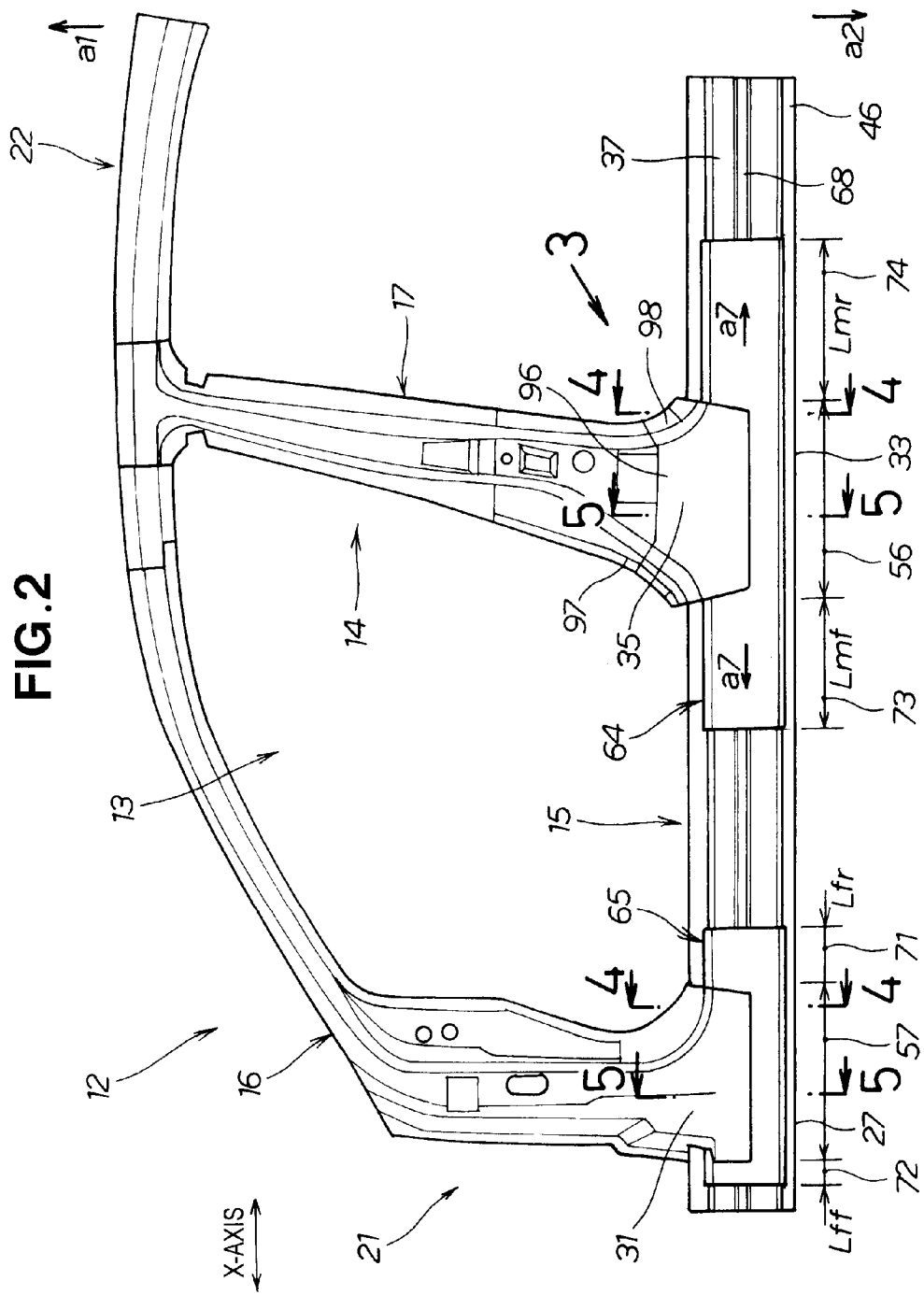
FIG. 2 is a side elevational view showing the vehicle body side part structure according to the first embodiment of the present invention.

As shown in FIGS. 1 and 2, a vehicle body 21 includes left and right side bodies 14, 14, a roof 22 connected between upper parts of the side bodies 14, an under body 23 connected between lower parts of the side bodies 14 and forming a floor of a passenger compartment 13, and a front body 24 disposed forwardly and continuous to the compartment 13. The front body 24 includes right and left front side frames 26, 26 extending from a vehicle front head 25 to the under body 23.

The vehicle body side part structure is constructed such that the front pillar 16 is joined at a lower part 31 thereof to a front part 27 of the side sill 15, and the center pillar 17 is joined at a lower part 35 thereof to a central part 33 of the side sill 15.

Now substantial features of the vehicle body side part structure of the present invention will be described with reference to FIGS. 1 to 5.

The vehicle body side part structure includes the side sill 15, 15 disposed at right and left edges of the floor of the passenger compartment 13 and extending in a front-back or longitudinal direction (in a direction of axis X) of the vehicle 12, the front pillar 16 extending vertically from the front part 27 of the side sill 15 to the roof 22, and the center pillar 17 extending vertically from the central part of the side sill 15 to the roof 22.

Figure 3:
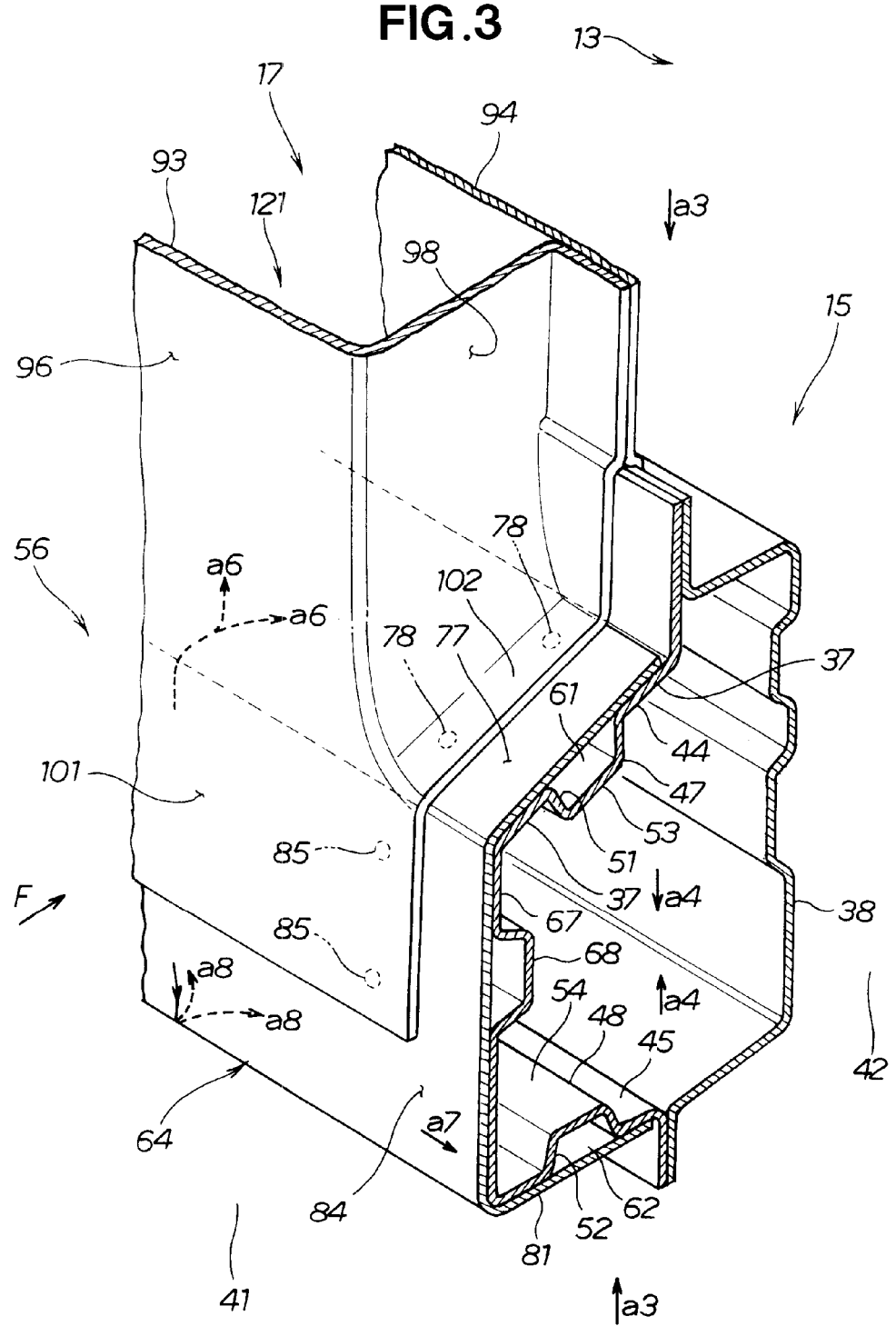
FIG. 3 is a perspective view of the first embodiment as viewed in the direction of arrow 3 in FIG. 2.
Figure 4:
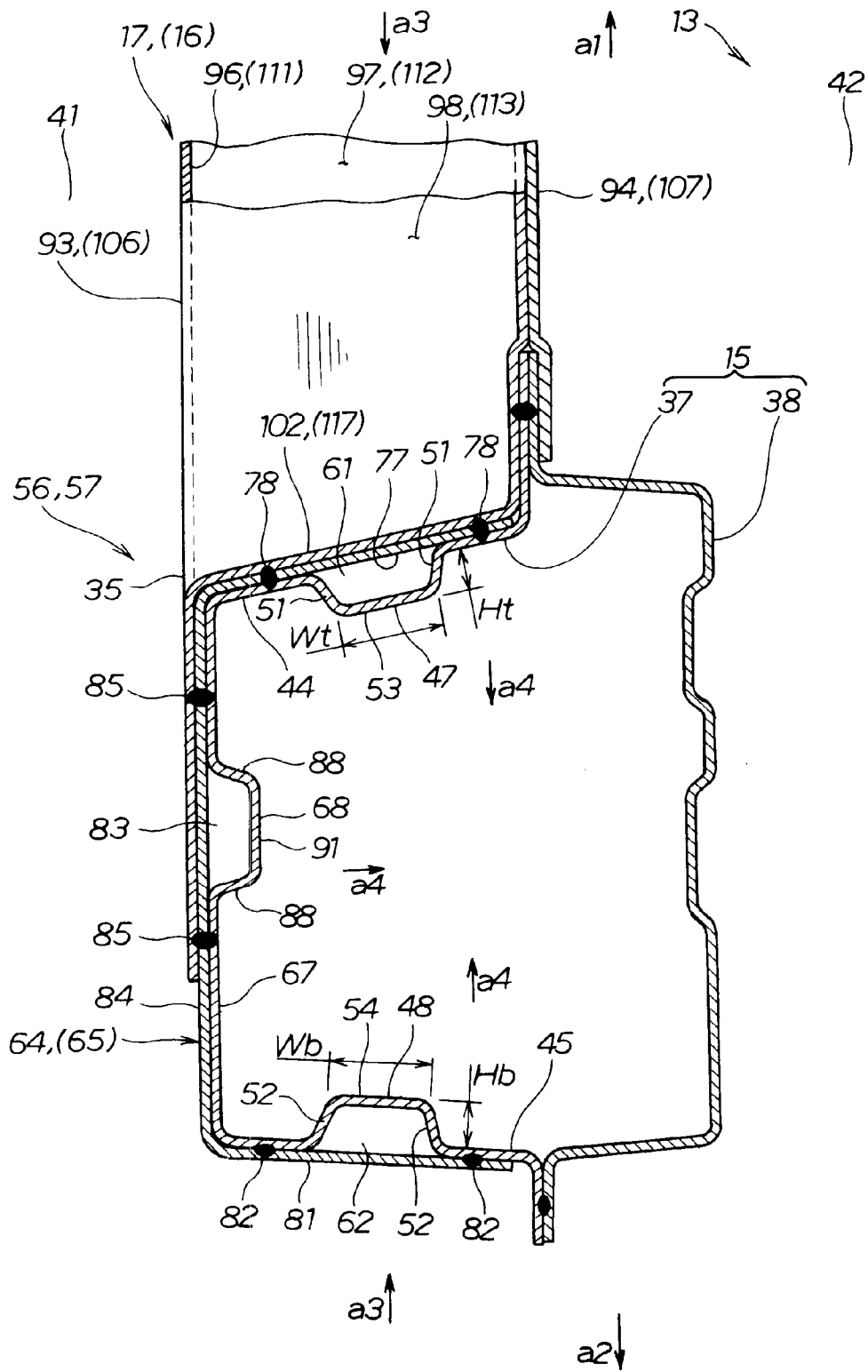
FIG. 4 is a cross-sectional view taken along line 4-4 of FIG. 2.
Figure 5:
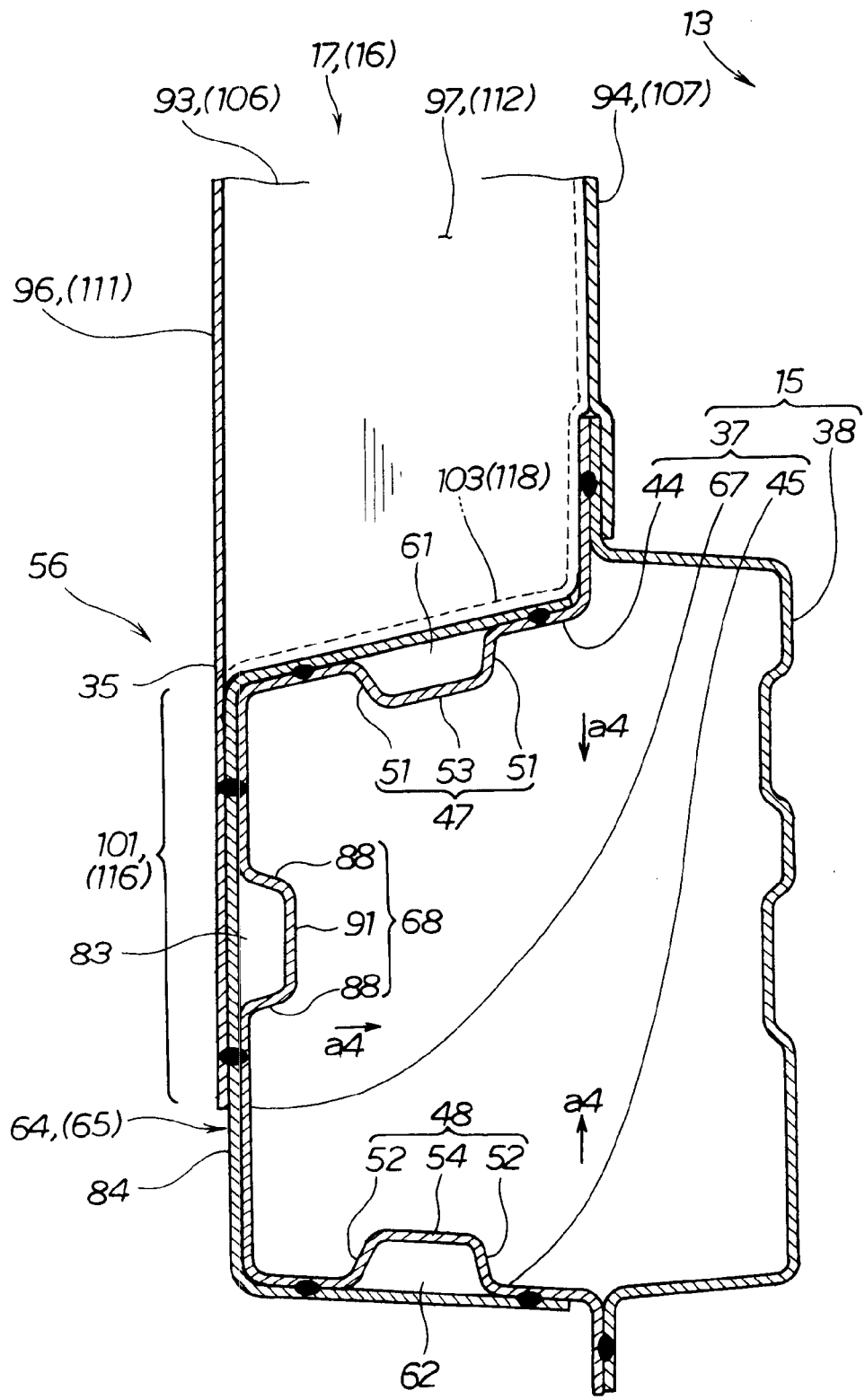
FIG. 5 is a cross-sectional view taken along line 5-5 of FIG. 2.

The side sill 15 includes an outer side sill member (a side sill outer) 37 and an inner side sill member (a side sill inner) 38 disposed such that both members jointly define a closed cross section as shown in FIGS. 3 to 5. As shown in FIG. 4, the outer side sill member 37 includes an upper wall 44 extending to slant upwardly (in a direction of arrow a1) from a vehicle exterior side 41 toward a vehicle interior side 42, and a lower wall 45 disposed opposite to the upper wall 44 and extending to slant downwardly (in a direction of arrow a2) from the vehicle exterior side 41 toward the vehicle interior side 42. At least the upper wall 44 of the upper and lower walls 44, 45 has a bead (upper bead) 47 formed to extend from the front part 27 to a rear part 47 of the side sill 15 so that the closed cross section of the side sill 15 is formed in a polygonal shape.

The lower wall 45 of the side sill 15 has a lower bead 48 formed to extend from the front part 27 to the rear part 46 of the side sill 15.

Each of the upper and lower beads 47, 48 is a groove-shaped recessed portion indented inwardly (in a direction of arrow a4) into the closed cross section as viewed from the exterior (in a direction of arrow a3) of the side sill 15. Each of the recessed portions includes a pair of lateral walls (groove side wall) 51, 52 and a bottom wall 53, 54, thus providing an opening 61, 62 at an opposite side of the bottom walls 53, 54, respectively. Namely, the upper and lower beads 47, 48 each have the opening 61, 62, the pair of lateral walls 51, 52 and the bottom wall 53, 54, thereby forming a substantial U-shape in cross section. It should be noted here that the respective bottom walls 53, 54 of the beads 47, 48 have a width Wt, Wb which is larger than a height Ht, Hb of the lateral walls 51, 52.

The bottom walls 53, 54 are continuous to the lateral walls 51, 52 and formed parallel with associated ones of the upper and lower walls 44, 45. The lateral walls 51, 52 are slanted in an angle range of 90 degrees plus/minus 15 degrees with respect to the upper and lower walls 44, 45, and otherwise disposed orthogonally to or perpendicularly of the upper and lower walls 44, 45.

The vehicle body side part structure is provided with a reinforcement member 64, 65, which is disposed on at least one of a central joining portion 56 of the central part 22 where the center pillar 17 is joined and a front joining portion 57 of the front part 27 where the front pillar 16 is joined in such a manner that the reinforcement member 64, 65 closes the openings 61, 62 opposing the bottom walls 53, 54 to define closed cross sections jointly the upper and lower beads 47, 48.

The reinforcement member 64 is located at the central joining portion 56, while the reinforcement member 65 is located at the front joining portion 57.

The outer side sill member 37 also includes a vertical wall 67 which is continuous to or connected between the upper and lower walls 44, 45 and located on the vehicle exterior side 41. The vertical wall 67 has a lateral bead 68 formed as a recessed portion similar to the upper and lower beads 47, 48. By thus providing the lateral bead 68, the number of sides and angles of the polygonal shape of the closed cross section of the side sill 15 is increased.

The reinforcement member 64, 65 is configured to close the openings of the upper and lower beads 47, 48 and the opening of the lateral bead 68, thus defining respective closed sections together with the beads 47, 48 and 68.

As shown in FIG. 2, the reinforcement member 65 has a rearward extension or elongated portion 71 extending rearwardly of the vehicle 12 from the front joining portion 57 by a desired length Lfr. The reinforcement member 65 also has a forward extension or elongated portion 72 extending forwardly of the vehicle 12 from the front joining portion 57 by a desired length Lff. This forward elongated portion 72, however, may be omitted.

Similarly, the reinforcement member 64 has at least one extension or elongated portion extending longitudinally forward or rearward of the vehicle 12 from the central joining portion 56, as shown in FIG. 2. For instance, the reinforce member 64 has a forward extension 73 elongated by a desired length Lmf. The reinforcement member 64 also has a rearward extension 74 extending rearwardly of the vehicle 12 from the central joining portion 56 by a desired length Lmr.

The reinforcement member 64 has an upper reinforcing part 77 which closes the opening 61 of the upper bead 47, thereby defining a closed cross section of the upper bead 47. The upper reinforcing part 77 laps over the upper wall 44 and is joined by spot-welding to the upper 44 wall at welded parts 78.

Similarly, the reinforcement member 64 also has a lower reinforcing part 81 which closes the opening 62 of the lower bead 48, thereby defining a closed cross section of the lower bead 48. The lower reinforcing part 81 is disposed continuous to the upper reinforcing part 77, laps over the lower wall 45, and is joined by spot-welding to the lower wall 45 at welded parts.

Furthermore, the reinforcement member 64 provides a vertical wall reinforcing part 84 which closes an opening 83 of the lateral bead 68, thereby defining a closed cross section of the lateral bead 68. The vertical wall reinforcing part 84 is disposed continuous to the upper and lower reinforcing parts 77, 81, laps over the vertical wall 67, and is joined by spot-welding to the vertical wall 67 at welded parts 85.

The reinforcement member 65 is constructed in a similar manner with the reinforcement member 64, and may be constructed in a modified form of the reinforcement member 64 according to various conditions required. For instance, the forward extension 72 may be omitted.

The upper bead 47 shown in FIG. 5 is formed on the side sill 15 shown in FIG. 2 so as to extend along the full length of the side sill 15 in the longitudinal direction of the vehicle body. The upper bead 47 has the pair of lateral walls 51, 51 projecting inwardly (in the direction of arrow a4) of the side sill 15 and the bottom wall 53 formed integrally with the lateral walls 51, 51.

Similarly, the lower bead 48 is formed to extend along the full length of the side sill 15 in the longitudinal direction of the vehicle body. The lower bead 48 has the pair of lateral walls 52, 52 projecting inwardly (in the direction of arrow a4) of the side sill 15, and the bottom wall 54 formed integrally with lateral walls 52, 52.

Further, the lateral bead 68 extends substantially horizontally along the full length of the side sill 15 in the longitudinal direction of the vehicle body. The lateral bead 68 a pair of lateral walls 88, 88 protruding inwardly (in the direction of arrow a4) of the side sill 15, and the bottom wall 91 formed integrally with lateral walls 88, 88.

The upper wall 44, vertical wall 67 and lower wall 45 of the outer side sill member 37 are configured to be flat to facilitate the welding exerted thereon. The bottom walls 53, 54, 91 of the upper, lower and lateral beads 47, 48, 68 are also configured to be flat. The front pillar 16 and the center pillar 17 are jointed to the above-mentioned outer side sill member 37.

The center pillar 17 is formed of an outer member 93 and an inner member 94, as shown in FIGS. 3 to 5. The outer member 93 has a U-shaped cross section, and an open end of the outer member 93 is closed by the inner member 94, so that the center pillar 17 has a closed cross section. Namely, the center pillar 17 has a hollow structure. The hollow space communicates with the opening of the upper bead 47 of the outer side sill member 37 of the side sill 15 when the reinforcement member 64 is not present.

The outer member 93 of the center pillar 17 is formed by a side wall 96, a front wall 97 and a rear wall 98. The center pillar side wall 96 has a first joint end 101 (FIG. 3) disposed at a lower end portion thereof, and the first joint end 101 is joined to the vertical wall 67 of the outer side sill member 37 with the vertical wall reinforcing part 84 of the reinforcement member 64 interposed therebetween.

Additionally the center pillar rear wall 98 has a second joint end 102 (FIG. 4) disposed at the lower end portion thereof, and the second joint end 102 is joined to the upper wall 44 of the outer side sill member 37 with the upper reinforcing part 77 of the reinforcement member 64 interposed therebetween.

Similarly the center pillar front wall 97 has a third joint end 103 (FIG. 5) disposed at the lower end portion thereof, and the third joint end 103 is joined to the upper wall 44 of the outer side sill member 37 with the upper reinforcing part 77 of the reinforcement member 64 interposed therebetween. It should be noted that the third joint end 103 has a configuration similar with the second joint end 102.

As described hereinabove, the center pillar 17 is joined to the side sill with the reinforcement member 64 interposed therebetween. The front pillar 16 is also joined to the side sill in the similar manner with the center pillar 17.

The front pillar 16 is formed by an outer member 106 of a U-shaped cross section and an inner member 107, and has a hollow structure of a closed section. The hollow space communicates with the opening of the upper bead 47 of the outer side sill member 37 of the side sill 15 when the reinforcement member 65 is not present. The outer member 106 is formed of a front pillar side wall 111, a front pillar front wall 112 and a front pillar rear wall 113.

The front pillar side wall 111 has a first joint end 116 disposed at a lower end portion thereof. Similarly, the front pillar rear wall 113 has a second joint end 117 at a lower end portion thereof, while the front pillar front wall 112 has a third joint end 118 at a lower end portion thereof.

The first, second and third joint ends 116, 117 and 118 of the front pillar are joined to the vertical wall reinforcing part 84 and the upper reinforcing part 77 of the reinforcement member 65, respectively, which in turn join to the vertical wall 67 and the upper wall 44, respectively of the outer side sill member 37 with the vertical wall reinforcing part 84 and the upper reinforcing part 77 disposed between the joint ends 116, 117, 118 and the vertical and upper walls 67, 44.

Now operation of the vehicle body side part structure according to the first embodiment will be described with reference to FIGS. 3 and 5.

As shown in FIG. 3, when a load is applied to the side sill 15 in the direction of arrow F, for instance, the load is transmitted to the upper reinforcing part 77 of the reinforcement member 64 and disperses in a manner as indicated by arrow a6. As a result, the side sill 15 will be subject to a decreased amount of load, consequently increasing the strength of the side sill 15.

Furthermore the load is transmitted to the upper reinforcing part 77 of the reinforcement member 64 positioned in an inside zone 121 of the center pillar 17 and then disperses in the manner as indicated by arrow a6, as the upper reinforcement part 77 serves to close the upper bead 47 to provide the closed cross section of the bead 47. Consequently the upper bead 47 will be subject to a decreased amount of load, thereby further increasing the strength of the side sill 15.

Sill further, the load is transmitted to the forward and rearward extensions 73, 74 of the reinforcement member 64 in a manner as indicated by arrows a6, a7 and a8, and then disperses therealong. With this arrangement, an area provided to sustain a lateral collision load is increased in the longitudinal direction of the vehicle 12.

Second Embodiment

FIGS. 6 to 9 illustrate a vehicle body side part structure according to a second embodiment of the present invention. Any members and elements of this embodiment which are similar to those of the first embodiment shown in FIGS. 1 to 5 are denoted by the same reference numerals and will not be explained to avoid redundancy.

The vehicle body side part structure according to the second embodiment of the present invention includes a bulkhead 131 disposed inside the side sill 15 and partitioning a hollow internal space of the side sill 15. The bulkhead 131 is located to overlap the reinforcement member 64 with the outer side sill member 37 interposed therebetween.

The reinforcement member 64 extends to such an extent that the reinforcement member 64 overlaps the bulkhead 131 in a widthwise direction of the vehicle while the bulkhead is positioned inside the side sill 15 to serve as a partition of the side sill 15.

Figure 9:
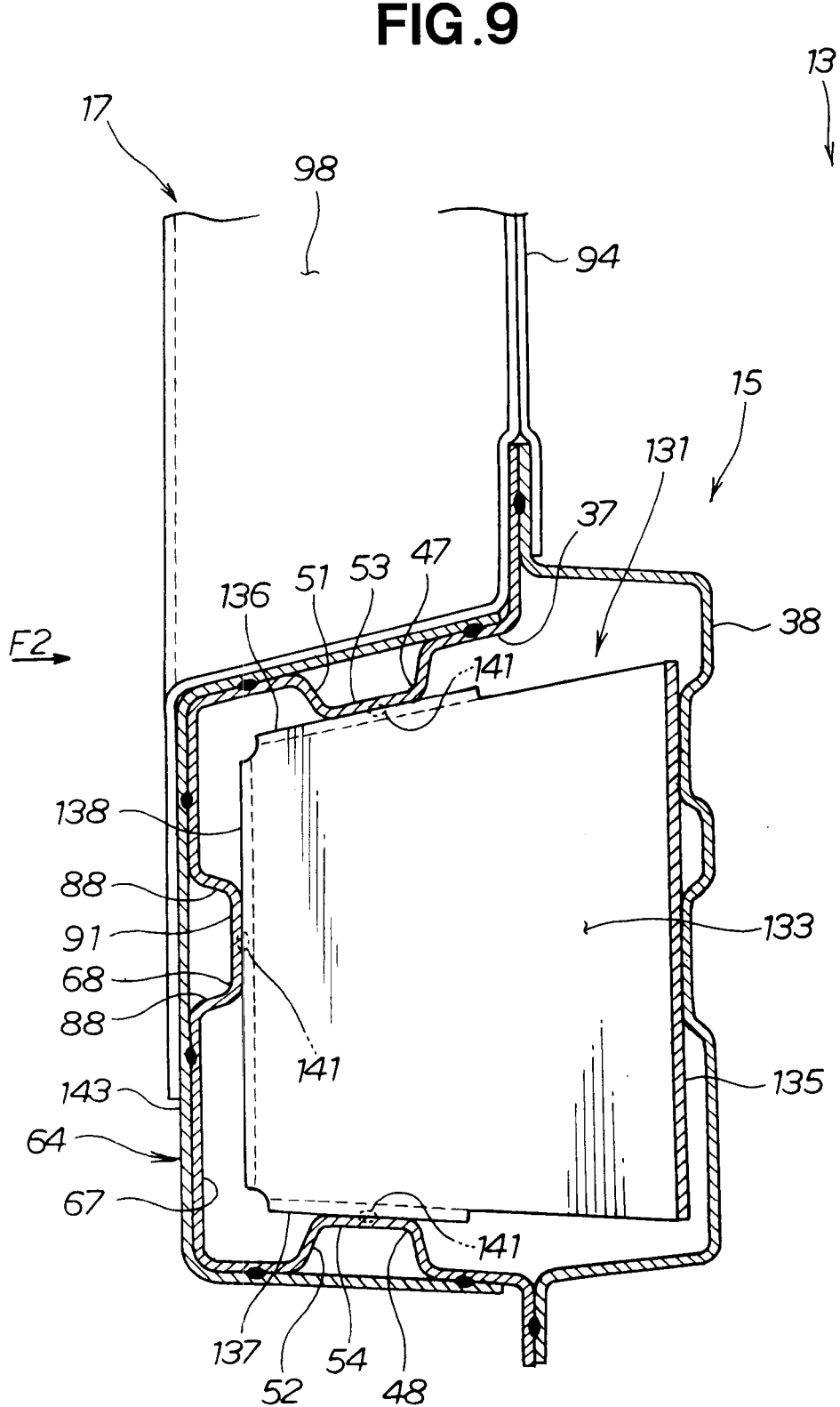
FIG. 9 is a cross-sectional view taken along line 9-9 of FIG. 6.

In FIG. 9, the bulkhead 131 and the outer side sill member 37 jointly defines a closed cross section. Specifically a combination of the bulkhead 131, a wall part of the outer side sill member 37, one lateral wall 51 of the upper bead 47 and one lateral wall 88 of the lateral bead 68 serves to define the closed cross section.

Similarly a combination of the bulkhead 131, a wall part of the outer side sill member 37, the other lateral wall 88 of the lateral bead 68 and one lateral wall 52 of the lower bead 48 serves to define a closed cross section.

Figure 7:
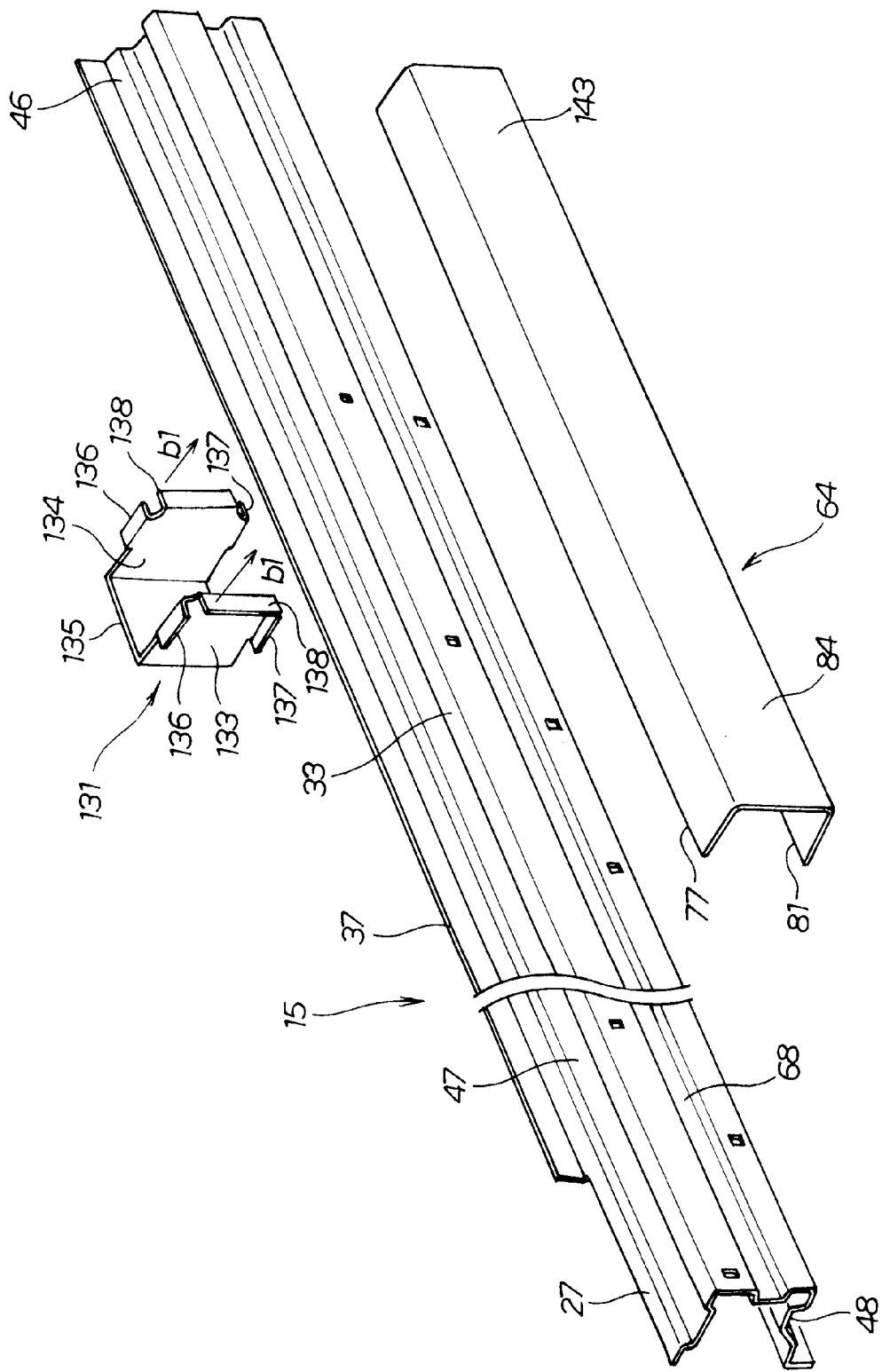
FIG. 7 is a perspective view of the vehicle body side part structure according to the second embodiment of the present invention.

As shown in FIG. 7, the bulkhead 131 has a U-shaped configuration and includes first and second partition walls 133, 134 extending perpendicularly to the longitudinal direction of the side sill 15 to partition the internal space of the side sill 15, and a central wall 135 formed integrally with the first and second partition walls 133, 134. Each of the first and second partition walls 133, 134 includes an upper attachment strip (upper flange) 136, a lower attachment strip (lower flange) 137 and a lateral attachment strip (lateral flange) 138 that are formed by bending orthogonally an upper edge, a lower edge and a free end edge, respectively, of each partition wall 133, 144.

As shown in FIG. 9, the bulkhead 131 is mounted fixedly to the side sill 15 such that the upper attachment strip 136 is secured to the upper bead 47, the lower attachment strip 137 is secured to the lower bead 48 and the lateral attachment strip 138 is secured to the lateral bead 68.

Now installation of the bulkhead 131 to the side sill 15 will be briefly explained hereinbelow.

Figure 8:
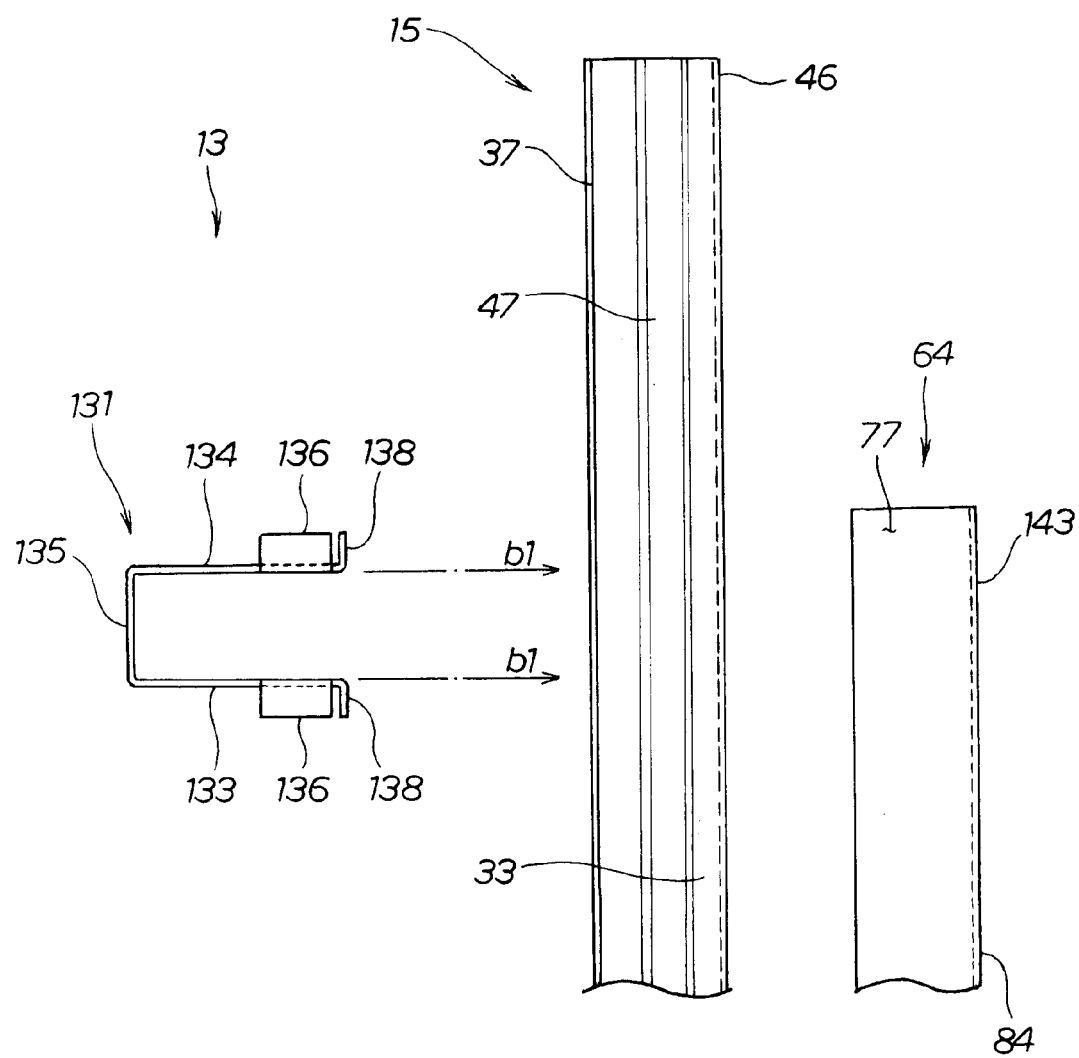
FIG. 8 is a plan view of the vehicle body side part structure according to the second embodiment of the present invention.

Firstly the bulkhead 131 is placed to be directed toward the outer side sill member 37 as indicated by arrow b1 shown in FIGS. 7 and 8. Then the bulkhead 131 is fitted in between the upper and lower beads 47, 48 as shown in FIG. 9.

Subsequently, the bulkhead 131 is fixed temporally in the side sill 15 by a suitable jig and welded thereto. The welding is achieved by a spot-welding process such that the upper and lower attachment strips 136, 137 are bonded at welded portions 141 to the corresponding bottom walls 53, 54 of the upper and lower beads 47, 48, respectively, and the lateral attachment strip 138 is bonded at a welded portion 41 to the bottom wall 91 of the lateral bead 68. Upon completion of those welding works, the outer side sill member 37 and the inner side sill member 38 are welded fixedly to each other.

Figure 6:
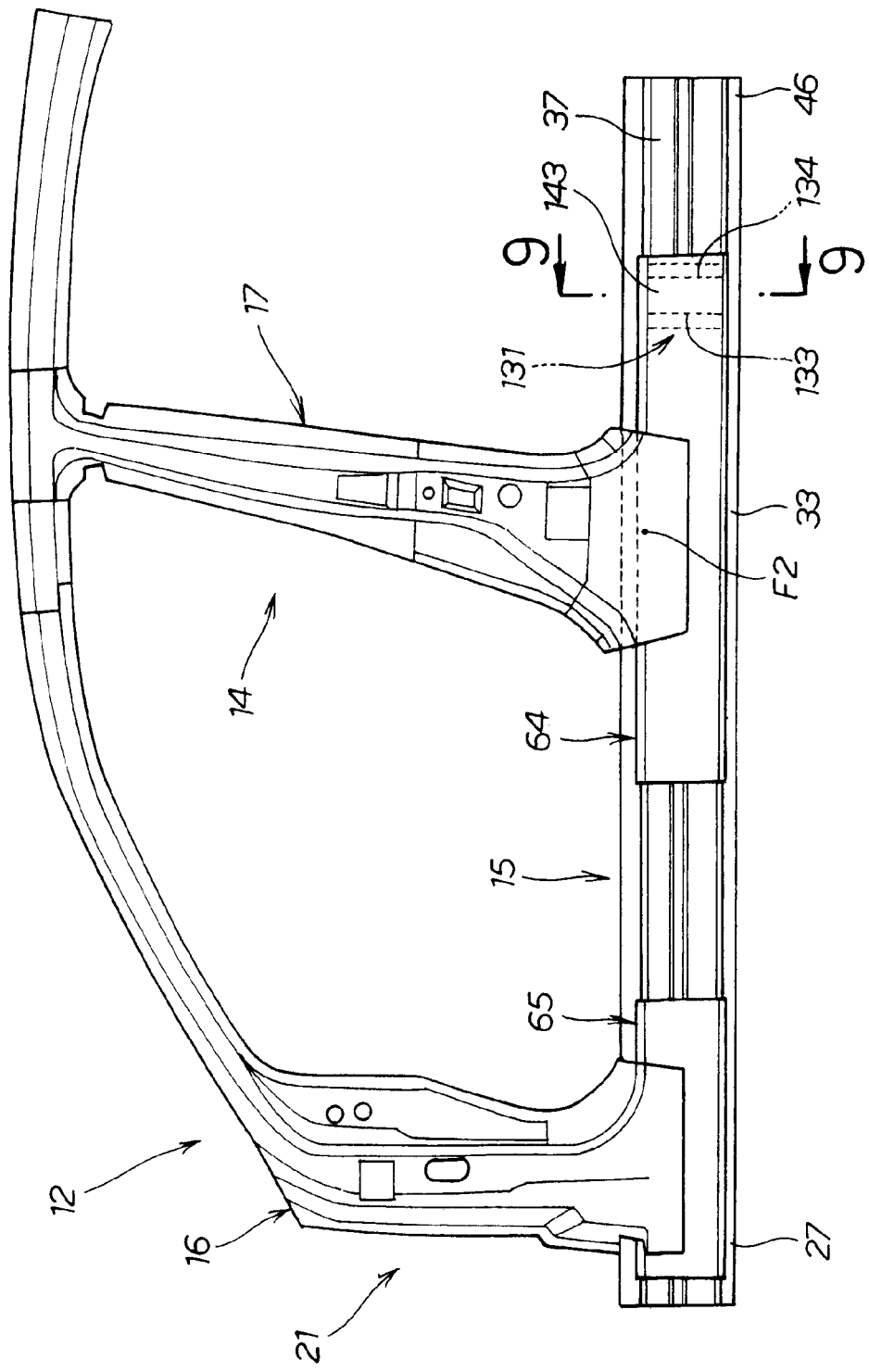
FIG. 6 is a side elevational view showing a vehicle body side part structure according to a second embodiment of the present invention.

Now an operation of the vehicle body side part structure according to the second embodiment will be described with reference to FIGS. 6 and 9.

When a load F2 is applied to the side sill 15 of the vehicle body side part structure according to the second embodiment, the load is transmitted to the reinforcement member 64 and subsequently to one longitudinal end of the reinforcement member 64 where the bulkhead 131 is located. Thus, from the one longitudinal end of the reinforcement member 64, the load F2 is transmitted via the outer side sill member 37 to the bulkhead 131 and thus dispersed into the bulkhead 131. As a result, the side sill 15 will be subject only to a decreased amount of load, thereby increasing the strength of the side sill 15.

Third Embodiment

Figure 10:
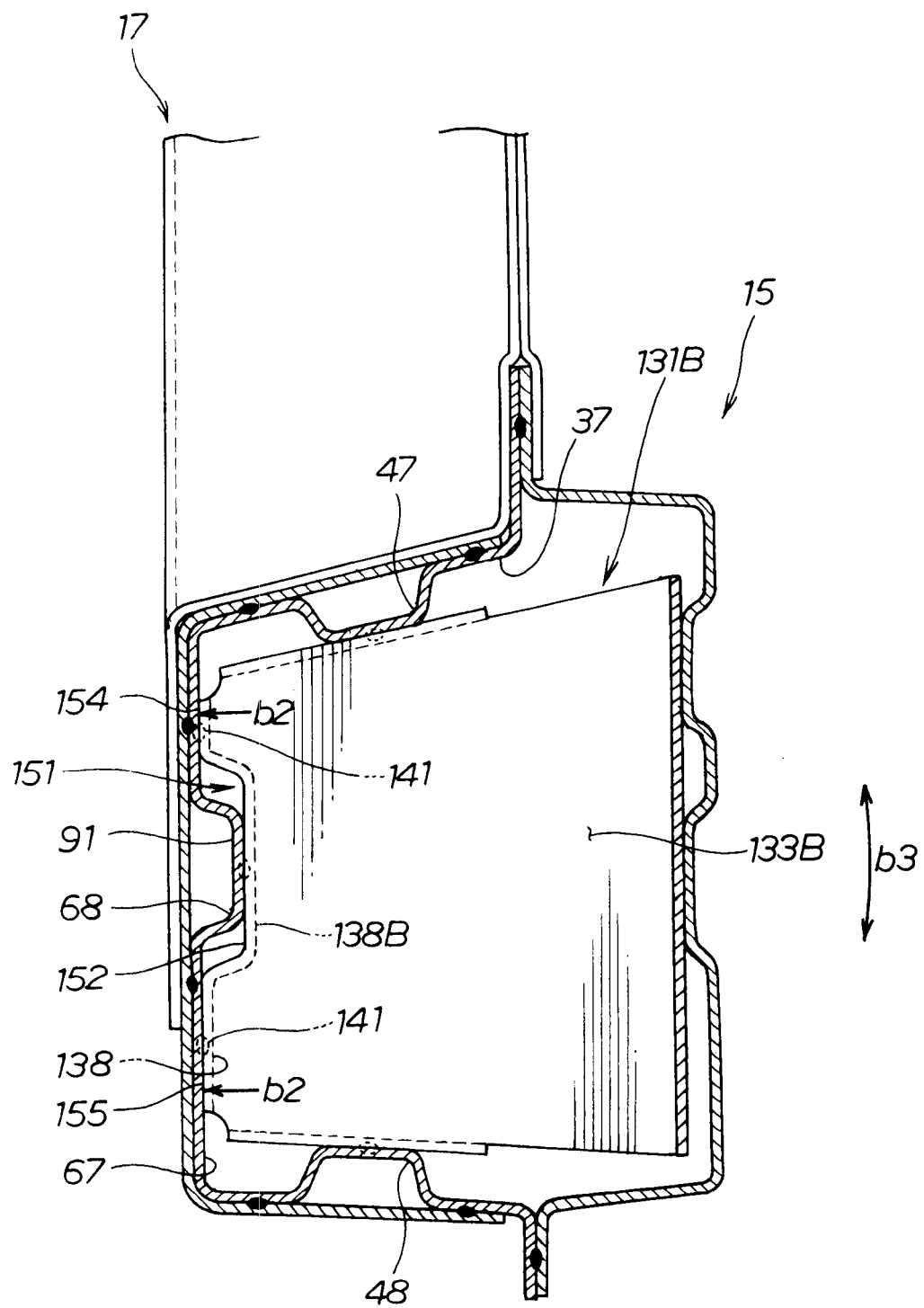
FIG. 10 is a view showing a vehicle body side part structure according to a third embodiment of the present invention.

Now, a vehicle body front part structure according to a third embodiment of the present invention is explained with reference to FIGS. 10 and 11. FIG. 10 corresponds to FIG. 9. Any structural features of this embodiment which are similar to those of the first and second embodiments shown in FIGS. 1 to 9 are denoted by the same reference numerals and will not be explained to avoid redundancy.

Figure 11:
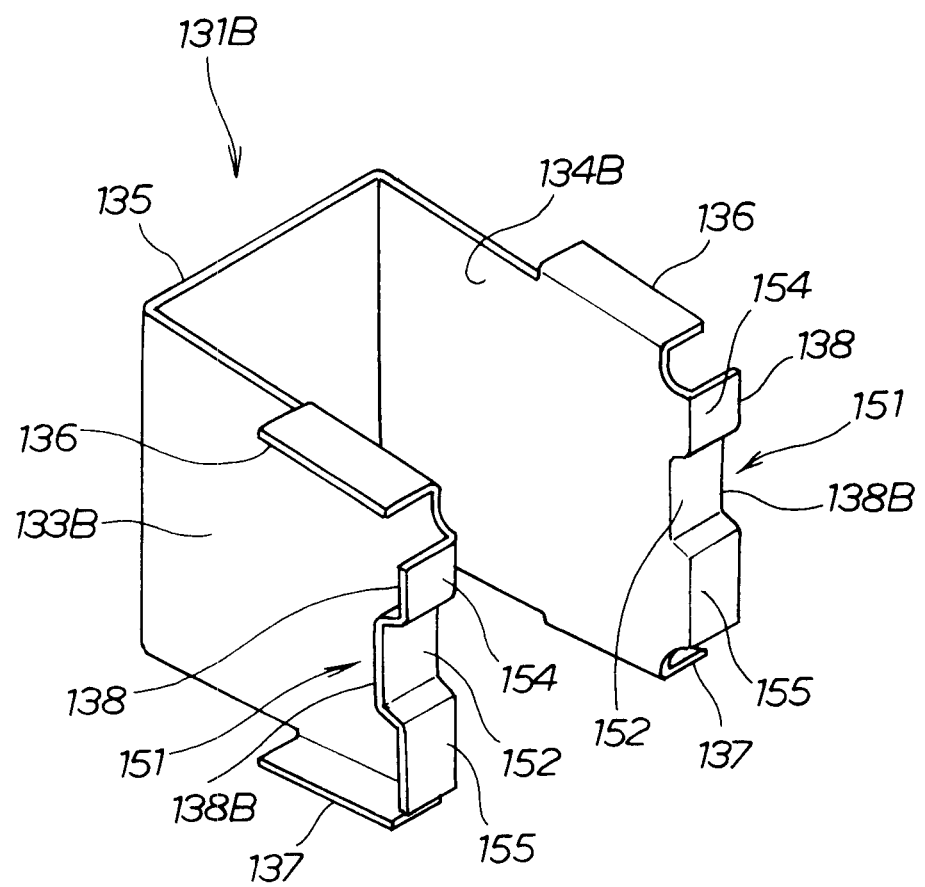
FIG. 11 is a perspective view illustrating a bulkhead shown in FIG. 10.

As shown in FIGS. 10 and 11, the vehicle body side part structure according to the third embodiment includes a bulkhead 131B which is provided with an engagement recess 151 fitted with the lateral bead 68. The engagement recess 151 has a bottom 152 which is in contact with the bottom wall 91 of the lateral bead 68. The bulkhead 131B includes a lateral attachment strip 138B having first and second attachment strip portions 154, 155 which are in contact with the vertical wall 67 of the outer side sill member 37.

The recess fit portion 151 of the bulkhead 131B is configured to fit with the lateral bead 68 formed on the outer side sill 37. The bulkhead 131B has first and second partition walls 133B, 134B, each provided with the lateral attachment flange 138B in which the engagement recess 151 is formed.

Consequently, that party of the lateral attachment flange 138, which excludes the engagement recess 151, namely the first and second attachment strip portions 154, 155 are in contact with the vertical wall 67 of the outer side sill member 37.

Now installation of the bulkhead 131B employed in the third embodiment of the present invention will now be briefly explained.

Firstly the bulkhead 1321B is inserted into the outer side sill member 37 in a manner similar to the second embodiment as shown in FIG. 8. Then the bulkhead 131B is fitted in between the upper and lower beads 47, 48 as shown in FIG. 10 such that the first and second attachment strip portions 154, 155 of the lateral attachment strip 138B are brought into contact with the vertical wall 67 of the outer side sill 37.

Then the bulkhead 131B is secured to the side sill by welding as was exerted for the second embodiment such that the first and second attachment strip portions 154, 155 are welded to the vertical wall 67 at welded portions 141. Thereafter the outer side sill member 37 is welded fixedly to the reinforcement member 64 and the inner side sill member 38.

As explained hereinabove, the vehicle body side part structure according to the third embodiment achieves similar function and advantageous effects with the second embodiment of the present invention.

Additionally, in the vehicle body side part structure according to the third embodiment, the bulkhead 131B is supported by the outer side sill member 37 as the first and second attachment strip portions 154, 155 butt against the vertical wall 67 of the outer side sill member 37 as indicate by arrows b2, b2, when the bulkhead 131B is fitted with the outer side sill member 37. With this arrangement, the bulkhead 131B is limited to tilt with respect to a vertical direction of the vehicle 11 (in a direction of arrow b3), thus facilitating the assembling of the bulkhead 131B onto the outer side sill member 37.

Fourth Embodiment

Figure 12:
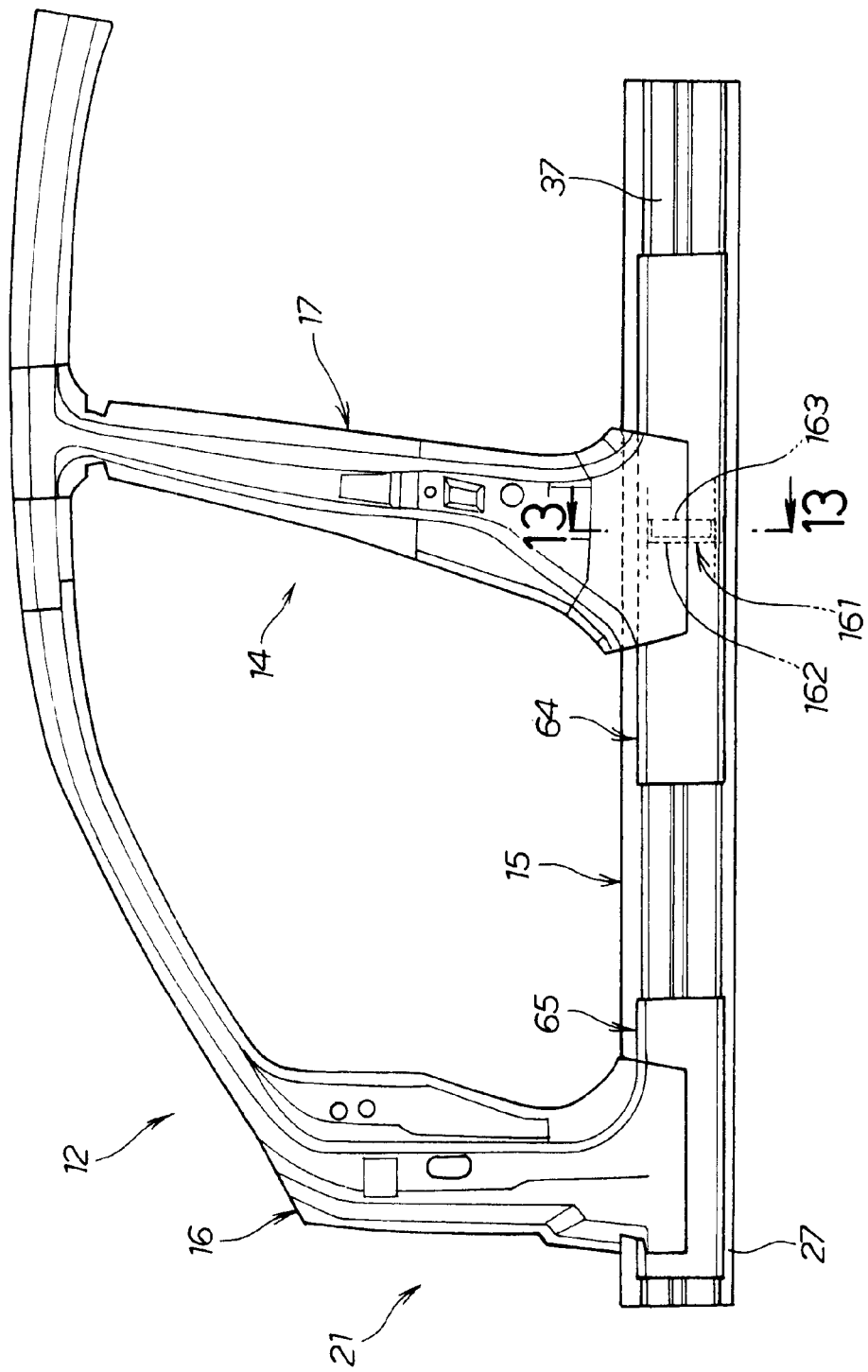
FIG. 12 is a side elevational view showing a vehicle body side part structure according to a fourth embodiment of the present invention.
Figure 13:
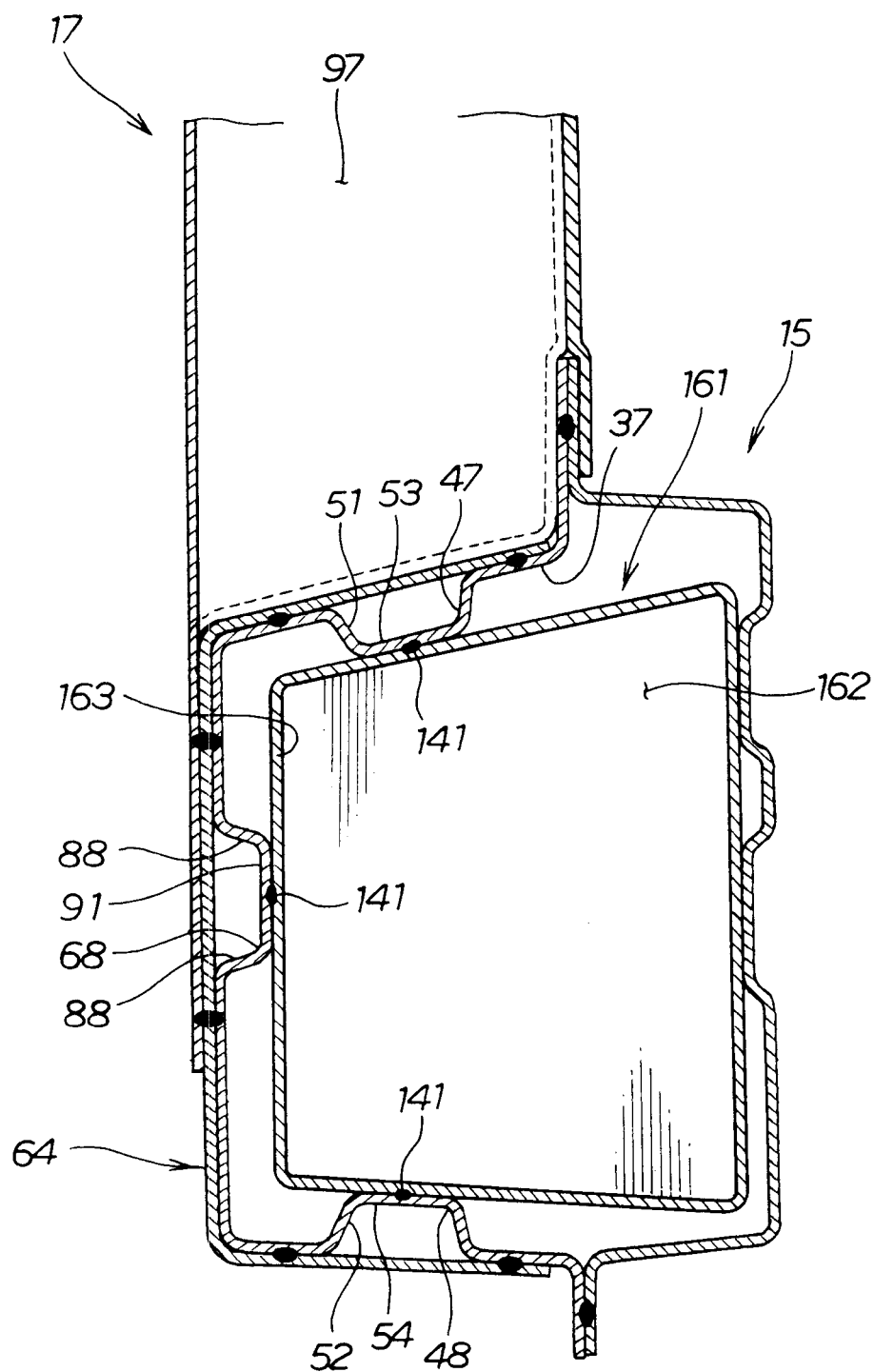
FIG. 13 is a cross-sectional view taken along line 13-13 of FIG. 12.

A vehicle body side part structure according to a fourth embodiment of the present invention will be described with reference to FIGS. 12 and 13. Any structural features of this embodiment which are similar to those of the first embodiment shown in FIGS. 1 to 5 are denoted by the same reference numerals and will not be explained to avoid redundancy.

For the vehicle body side part structure of the fourth embodiment, a bulkhead 161 is located in the side sill 15 at such position to overlap the reinforcement member 64 with the outer side sill member 37 interposed therebetween. The bulkhead 161 serves as a partition inside the side sill 15.

A closed cross section is defined jointly by bulkhead 161 and the outer side sill member 37. Specifically the bulkhead 161 defines the cross section jointly with a wall portion of outer side sill member 37, one of the lateral walls 51 of the upper bead 47 and one of the lateral walls 88 of the lateral bead 68.

Similarly the bulkhead 161 defines another cross section jointly with a wall portion of outer side sill member 37, one of the lateral walls 52 of the lower bead 48 and the other lateral wall 88 of the lateral bead 68.

The bulkhead 161 has a partition wall 162 which is provided with an attachment rim or flange 163 projecting at a right angle or orthogonally from a peripheral edge of the partition wall 162.

The bulkhead 161 is installed to the side sill in a similar manner with the second embodiment. Each of the beads 47, 48 and 68 has respective bottom walls 53, 54 and 91 which are spot-welded to the attachment rim 163 at welded portions 141.

The vehicle body side part structure according to the fourth embodiment achieves the similar function and advantageous effects with the second embodiment of the present invention.

Fifth Embodiment

Figure 14:
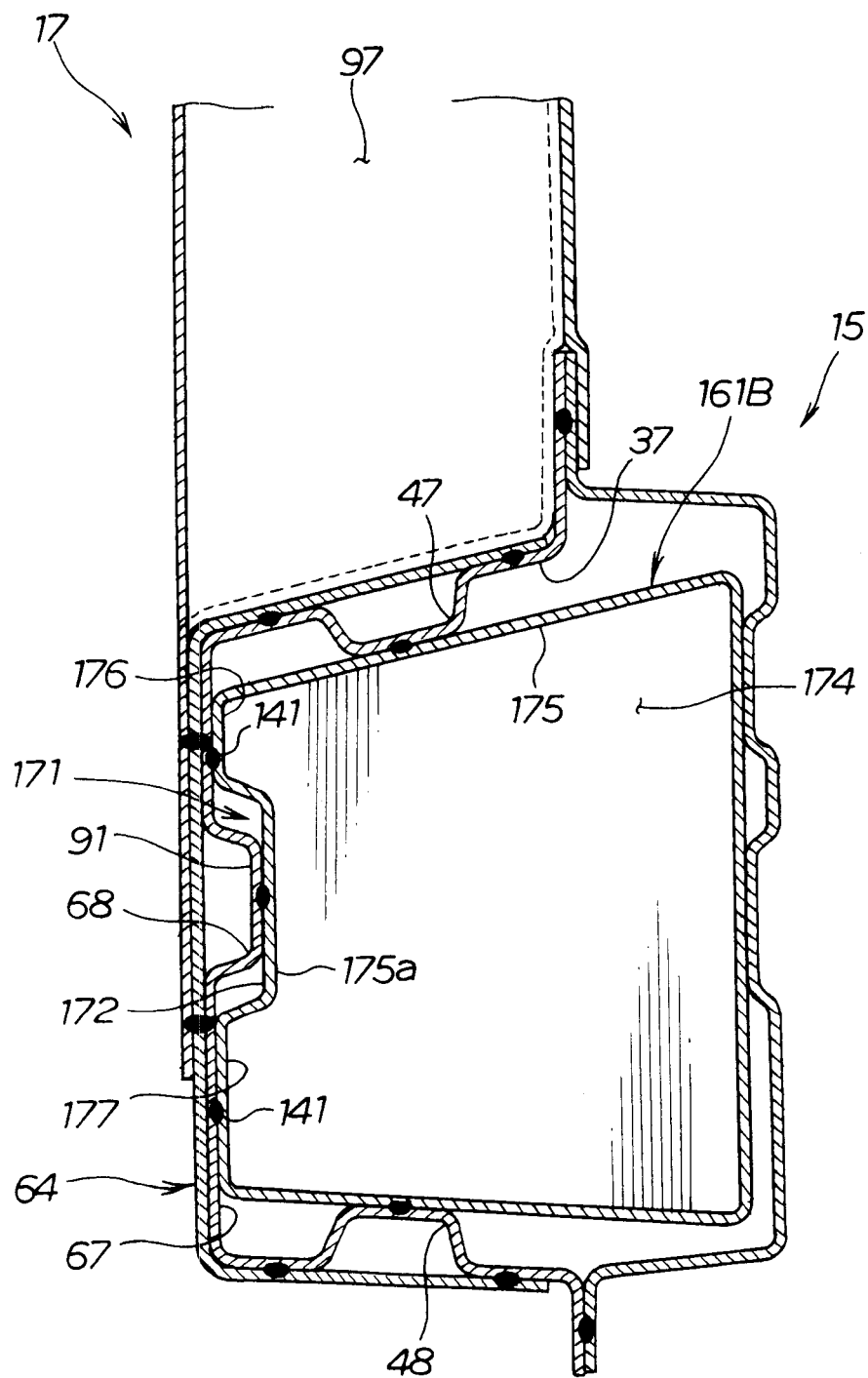
FIG. 14 is a side elevational view showing a vehicle body side part structure according to a fifth embodiment of the present invention.

A vehicle body side part structure according to a fifth embodiment of the present invention will be described with reference to FIG. 14. FIG. 14 corresponds to FIG. 13. Any structural features of this embodiment which are similar to those of the first and fourth embodiment shown in FIGS. 1 to 5, 12 and 13 are denoted by the same reference numerals and will not be explained to avoid redundancy.

A bulkhead 161B according to the fifth embodiment is provided with an engagement recess 171 for engagement with the lateral bead 68. The engagement recess 171 has a bottom 172 which is in contact with the bottom wall 91 of the lateral bead 68. A peripheral attachment rim or flange 175 of the bulkhead 161B has first and second attachment portions 176, 177 which are in contact with the vertical wall 67 of the outer side sill member 37.

The bulkhead 161B has a partition wall 174 and the attachment rim 175 is provided on and along a peripheral edge of the partition wall 174 and projecting at a right angle from the peripheral edge. The engagement recess 171 has an attachment portion 175a disposed at the bottom 172 thereof.

With this arrangement, of that part of the attachment rim 175 which faces the vertical wall 67, first and second attachment strip portions 154, 155 excluding the attachment 175a of the engagement recess 171 are in contact with the vertical wall 67 of the outer side sill member.

The bulkhead 161B is installed to the side sill in a similar manner with the third embodiment. The first and second attachment portions 176, 177 are spot-welded to the vertical wall 67 at welded portions 141.

The vehicle body side part structure according to the fifth embodiment achieves the similar function and advantageous effects with the third embodiment of the present invention.

The beads of the embodiments described above are recessed portions dented inwardly of the closed cross section. However, the bead may be configured to protrude outwardly of the closed cross section. In such case, the bulkhead should be provided with an engagement protrusion for engagement with the corresponding bead protruding outwardly from the closed cross section.

The reinforcement member 64 explained hereinabove is of one piece consisting of the upper and lower reinforcing parts 77, 81 and the vertical reinforcing part 84. However, these parts may be separated in to three pieces.

INDUSTRIAL APPLICABILITY

The vehicle body side part structure according to the present invention can be suitably used in a vehicle with an increased strength against a lateral collision.

REFERENCE SIGNS LIST 12 vehicle
13 passenger compartment
15 side sill
16 front pillar
17 center pillar
22 roof
27 front part of side sill
33 central part of side sill
37 outer side sill member
38 inner side sill member
44 upper wall
45 lower wall
47 upper bead
48 lower bead
51 lateral wall of recessed portion
52 lateral wall of recessed portion
53, 54 bottom wall of recessed portion
56 central joining portion
557 front joining portion
61, 62 opening of bead
64, 65 reinforcement member
67 vertical wall of outer side sill member
68 lateral bead
71, 74 rearward extension of reinforcement member
73 forward extension of reinforcement member
88 lateral wall
91 bottom wall
131, 131B bulkhead
138 lateral attachment strip
151 engagement recess
161 bulkhead
Hb, Ht height of lateral wall of recessed portion
Wb, Wt width of bottom wall of recessed portion

The invention claimed is:

1. A vehicle body side part structure comprising:
a side sill disposed on right and left sides of a floor of a vehicle body and extending in a longitudinal direction of the vehicle body;
a front pillar extending from a front part of the side sill to a roof; and
a center pillar extending from a central part of the side sill to the roof,
wherein the side sill is formed of an outer side sill member and an inner side sill member, the outer and inner side sill members jointly defining a closed cross section extending in the longitudinal direction of the vehicle body;
wherein the outer side sill member includes an upper wall extending to slant upwardly from a vehicle exterior side toward a vehicle interior side and a lower wall extending to slant downwardly from the vehicle exterior side toward the vehicle interior side, the upper wall having an upper bead extending from a front end of the side sill to a rear end thereof such that the closed cross section of the side sill is formed in a polygonal shape,
wherein the upper bead is a recessed portion indented inwardly of the closed cross section of the side sill and including a pair of opposed lateral walls and a bottom wall formed integrally with the lateral walls so as to define therebetween an opening, and the bottom wall has a width greater than a height of the lateral walls,
wherein the front pillar and the center pillar have a hollow structure including a hollow internal space defined therein, the hollow internal space communicating with the opening of the upper bead, and
wherein the central part of the side sill has a central joining portion where the center pillar is joined to the side sill, the front part of the side sill has a front joining portion where the front pillar is joined to the side sill, and at least one of the central and front joining portions is provided with a reinforcement member, the reinforcement member being structurally independent from the center pillar, front pillar and side sill and disposed between the outer side sill member and the center pillar or the front pillar, the reinforcement member having an upper reinforcing part arranged to overlap the upper wall of the outer side sill member and close that part of the opening of the upper bead that communicates with the hollow internal space of eth center pillar or the front pillar, the upper reinforcing part defining a second closed cross section jointly with the bead.

2. The vehicle body side part structure according to claim 1, wherein the outer side sill member includes a vertical wall connected between the upper wall and the lower wall and located on the vehicle exterior side, a lower bead formed on the lower wall and having substantially the same configuration as the upper bead, and a lateral bead formed on the vertical wall such that the closed cross section defined between the outer and inner side sill members is formed in a polygonal shape, the lateral bead having substantially the same configuration as the upper and lower beads, and wherein the reinforcement member further has a vertical wall reinforcing part contiguous with the upper reinforcing part and a lower reinforcing part contiguous with the vertical wall reinforcing part, the lower reinforcing part and the vertical wall reinforcing part being arranged to overlap the lower wall and the vertical wall, respectively, of the outer side sill member and close an opening of the lower bead and an opening of the lateral bead to form respective closed cross sections jointly with the lower and lateral beads.

3. The vehicle body side part structure according to claim 1, wherein the reinforcement member has an elongated portion extending rearwardly of the vehicle body from the front joining portion of the side sill by a desired length.

4. The vehicle body side part structure according to claim 1, wherein the reinforcement member has an elongated portion extending longitudinally in at least one of a forward direction and a rearward direction of the vehicle body from the central joining portion of the side sill by a desired length.

5. The vehicle body side part structure according to claim 1, wherein the side sill includes a bulkhead disposed therein to partition an internal space of the side sill, the bulkhead being arranged to overlap the reinforcing member via the outer side sill member in a widthwise direction of the vehicle body.

6. The vehicle body side part structure according to claim 1, wherein the side sill includes a bulkhead disposed therein to partition an internal space of the side sill, the reinforcement member has an elongated portion extending longitudinally in at least one of a forward direction and a rearward direction of the vehicle body from the central joining portion of the side sill by a desired length, and the bulkhead is disposed in alignment with a distal end of the elongated portion of the reinforcing member in a widthwise direction of the vehicle body.

7. The vehicle body side part structure according to claim 5, wherein the bulkhead defines a closed cross section jointly with the outer side sill member.

8. The vehicle body side part structure according to claim 5, wherein the bulkhead has an engagement recess fitted with a lateral bead formed on a vertical wall of the outer side sill member, a bottom of the engagement recess being in contact with a bottom wall of the lateral bead, and a part of the bulkhead excluding the engagement recess is in contact with the vertical wall of the outer side sill member.

9. The vehicle body side part structure according to claim 6, wherein the bulkhead defines a closed cross section jointly with the outer side sill member.

10. The vehicle body side part structure according to claim 6, wherein the bulkhead has an engagement recess fitted with a lateral bead formed on a vertical wall of the outer side sill member, a bottom of the engagement recess being in contact with a bottom wall of the lateral bead, and a party part of the bulkhead excluding the engagement recess is in contact with the vertical wall of the outer side sill member.

11. The vehicle body side part structure according to claim 5, wherein the outer side sill member includes a vertical wall connected between the upper wall and the lower wall and located on the vehicle exterior side, a lower bead formed on the lower wall and having substantially the same configuration as the upper bead, and a lateral bead formed on the vertical wall such that the closed cross section defined between the outer and inner side sill members is formed in a polygonal shape, the lateral bead having substantially the same configuration as the upper and lower beads, and wherein the reinforcement member further has a vertical wall reinforcing part contiguous with the upper reinforcing part and a lower reinforcing part contiguous with the vertical wall reinforcing part, the lower reinforcing part and the vertical wall reinforcing part being arranged to overlap the lower wall and the vertical wall, respectively, of the outer side sill member and close an opening of the lower bead and an opening of the lateral bead to form respective closed cross sections jointly with the lower and lateral beads.

12. The vehicle body side part structure according to claim 11, wherein each of the front pillar and the center pillar is formed of an outer member having a substantially U-shaped cross section, and an inner member joined with the outer member so as to close an open end of the U-shaped outer member, the U-shaped outer member having a side wall, a front wall facing in the forward direction of the vehicle body, and a rear wall facing in the rearward direction of the vehicle body, the side wall having a first joint end joined with the vertical wall of the outer side sill member with the vertical wall reinforcement part of the reinforcing member interposed therebetween, the front wall has a second joint end joined with the upper wall of the outer side sill member with the upper reinforcement part of the reinforcement member interposed therebetween, and the rear wall having a third joined end joined with the upper wall of the outer side sill member with the upper reinforcement part of the reinforcement member interposed therebetween.

13. The vehicle body side part structure according to claim 6, wherein the outer side sill member includes a vertical wall connected between the upper wall and the lower wall and located on the vehicle exterior side, a lower bead formed on the lower wall and having substantially the same configuration as the upper bead, and a lateral bead formed on the vertical wall such that the closed cross section defined between the outer and inner side sill members is formed in a polygonal shape, the lateral bead having substantially the same configuration as the upper and lower beads, and wherein the reinforcement member further has a vertical wall reinforcing part contiguous with the upper reinforcing part and a lower reinforcing part contiguous with the vertical wall reinforcing part, the lower reinforcing part and the vertical wall reinforcing part being arranged to overlap the lower wall and the vertical wall, respectively, of the outer side sill member and close an opening of the lower bead and an opening of the lateral bead to form respective closed cross sections jointly with the lower and lateral beads.

14. The vehicle body side part structure according to claim 13, wherein each of the front pillar and the center pillar is formed of an outer member having a substantially U-shaped cross section, and an inner member joined with the outer member so as to close an open end of the U-shaped outer member, the U-shaped outer member having a side wall, a front wall facing in the forward direction of the vehicle body, and a rear wall facing in the rearward direction of the vehicle body, the side wall having a first joint end joined with the vertical wall of the outer side sill member with the vertical wall reinforcement part of the reinforcing member interposed therebetween, the front wall has a second joint end joined with the upper wall of the outer side sill member with the upper reinforcement part of the reinforcement member interposed therebetween, and the rear wall having a third joined end joined with the upper wall of the outer side sill member with the upper reinforcement part of the reinforcement member interposed therebetween.

\* \* \* \* \*